United States Patent
Rowlett et al.

(10) Patent No.: US 6,745,709 B2
(45) Date of Patent: Jun. 8, 2004

(54) REPLACEABLE GROUND ENGAGING TIP AND WEAR RESISTANT INSERT THEREFOR

(75) Inventors: Don C. Rowlett, Bedford, PA (US); Henry J. Bergen, Coaldale (CA); David H. Bergen, Coaldale (CA)

(73) Assignees: Kennametal Inc., Latrobe, PA (US); .; GEN Manufacturing Ltd., Coaldale (CA)

( * ) Notice: Subject to any disclaimer, the term of this patent is extended or adjusted under 35 U.S.C. 154(b) by 0 days.

(21) Appl. No.: 10/160,489

(22) Filed: May 31, 2002

(65) Prior Publication Data

US 2003/0221600 A1 Dec. 4, 2003

(51) Int. Cl.⁷ .......................... A01B 15/00; A01B 23/00; A01C 5/00
(52) U.S. Cl. ........................ 111/152; 111/154; 172/719; 172/747; 172/770; 172/772.5; 37/453; 37/460; 37/903
(58) Field of Search .................. 111/156, 152–154, 111/124–126, 111; 172/719, 722, 747, 753, 772, 772.5, 765, 723, 701.2, 701.3, 701.1; 37/460, 452–458, 446, 903

(56) References Cited

U.S. PATENT DOCUMENTS

| | | | |
|---|---|---|---|
| 3,319,722 A | * 5/1967 | Marron ........................ 172/719 |
| 3,882,594 A | * 5/1975 | Jackson et al. ......... 172/719 X |
| 4,711,503 A | * 12/1987 | Berchem et al. ........ 172/719 X |
| 4,955,297 A | * 9/1990 | Tsukamoto ............. 172/719 X |
| 5,159,985 A | 11/1992 | Rowlett ........................ 172/723 |
| 5,224,555 A | * 7/1993 | Bain et al. ............... 172/719 X |
| 5,297,637 A | 3/1994 | Rowlett ....................... 172/604 |
| 5,310,009 A | 5/1994 | Rowlett ....................... 172/723 |
| 5,314,029 A | 5/1994 | Rowlett ....................... 172/699 |
| 5,325,799 A | 7/1994 | Rowlett ....................... 111/152 |
| 5,429,016 A | 7/1995 | Rowlett ........................ 76/115 |
| 5,473,829 A | 12/1995 | Adrian et al. ................. 37/446 |
| 5,697,308 A | 12/1997 | Rowlett ....................... 111/149 |
| 5,787,991 A | 8/1998 | Tuttle ......................... 172/194 |
| 5,787,994 A | 8/1998 | Friesen .................... 172/772.5 |
| 5,850,790 A | 12/1998 | Salte .......................... 111/149 |
| 5,964,300 A | 10/1999 | Wattonville et al. ........ 172/700 |
| 6,003,617 A | * 12/1999 | McSweeney et al. ....... 172/719 |
| 6,318,279 B1 | 11/2001 | Rowlett et al. ............. 111/154 |

* cited by examiner

*Primary Examiner*—Christopher J. Novosad
(74) *Attorney, Agent, or Firm*—Larry R. Meenan

(57) ABSTRACT

A ground engaging tip for a seed boot attachment for depositing a seed within a furrow. The tip including a conical shape member formed of three generally planar shape side surfaces wherein two of the side surfaces meet to form an inclined leading edge extending from a tip of the conical shape member; and at least one wear resistant insert. The insert is secured to the leading edge of the ground engaging tip and includes a generally elongated bar having a leading end, a trailing end and three connecting side surfaces, a first side, second side and third side. The first, second and third side surfaces form a bar having a generally triangular cross-section, wherein the leading end of the bar is angled.

18 Claims, 3 Drawing Sheets

REPLACEABLE GROUND ENGAGING TIP AND WEAR RESISTANT INSERT THEREFOR

BACKGROUND OF THE INVENTION

1. Field of the Invention

The present invention relates to a replaceable ground engaging tip and a wear resistant insert therefor. More particularly, the present invention relates to a replaceable ground engaging tip including a wear resistant insert for use on a ground engaging planting/seeding tool.

2. Description of the Related Art

The proper depositing of seeds and fertilizer into a v-shaped furrow formed in the soil requires special care in handling the seeds and the fertilizer and in maintaining the sidewalls of the furrow to ensure that the seed and the fertilizer are deposited within the v-shaped furrow at the proper depth. The agricultural industry is striving toward larger and more efficient one pass seeder systems for minimal tillage and no-till seeding. Furthermore, the agricultural industry is striving to increase the life of the seeder parts thereby increasing efficiencies in seed placement, crop yields, planting time and decreasing overall maintenance of the planters.

It will be appreciated that if any part of a seed boot is in a worn condition, loose soil from the sidewalls of the v-shaped furrow may spill into the furrow before the seed and fertilizer are deposited or the seed and fertilizer may be blown or bounced around or out of the furrow, such that the seed and fertilizer are prevented from being deposited in the furrow or from reaching a proper planting depth.

Replacement of any part of a seed boot results in lost planting time and reduced cost efficiency. Previous attempts to improve the wear life of a seed boot have met with limited success.

To address the foregoing concerns, the present invention includes wear resistant inserts of a specific geometry secured to a replaceable ground engaging tip of a seed boot.

SUMMARY OF THE INVENTION

The present invention is directed to a ground engaging tip for a seed boot.

An exemplary embodiment of the invention includes a ground engaging tip including a conical shape member formed of three generally planar shape side surfaces wherein two of the side surfaces meet to form an inclined leading edge extending from a tip of the conical shape member; and at least one wear resistant insert secured to the leading edge of the ground engaging tip, the insert comprising a generally elongated bar having a leading end, a trailing end and three connecting side surfaces, a first side, second side and third side, to form a bar having a generally triangular cross-section, wherein the leading end of the bar is angled.

BRIEF DESCRIPTION OF THE DRAWINGS

The invention may take physical form in certain parts and arrangements of parts, preferred embodiments of which will be described in detail in this specification. The invention is illustrated in the accompanying drawings which show.

DESCRIPTION OF THE PREFERRED EMBODIMENT

Figure 1:
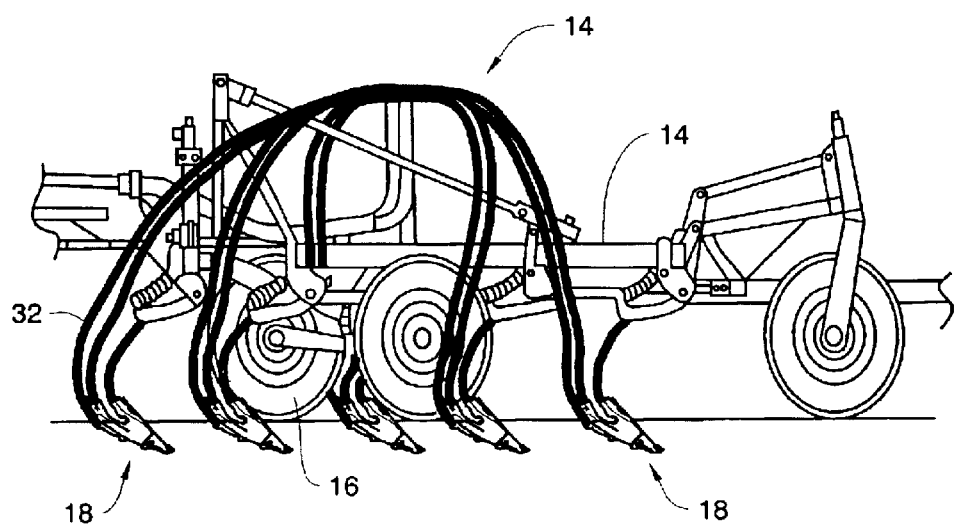
FIG. 1 is a side view of a tiller.

Referring now to the drawings there is shown a seed boot attachment 10. The attachment 10 is one component of a modular seed planting system 12, see FIG. 1. The seed planting system 12 includes an elongated tool bar 14 which is supported for movement across and over fields by a plurality of wheels 16 and which is adapted to be towed in a given forward direction by a power source such as an off-highway tractor or the like. Attached to the tool bar 12 are a plurality of planting units 18; with only one being illustrated in FIG. 2 and described in detail and from which a complete understanding of the present invention may be readily discerned.

As is well known in the art, the planting units 18 are mounted in side-by-side relation relative to each other along the length of the tool bar 14. In the illustrated embodiment, each planting unit 18 preferably includes a replaceable ground engaging tip 20, a narrow main body member 22 and a rear seed boot attachment 10. The ground engaging tip 20, main body member 22 and seed boot attachment 10 may be made by casting from austempered ductile iron, chrome iron, heat treated steel and alloy steel and the like.

In the illustrated embodiment, the ground engaging tip 20 is of a design to be secured to the front end of the main body member 22 and rear seed boot attachment 10 such as, for example, a design commercially available from GEN Manufacturing Ltd., of Coaldale, Alberta, Canada. This seeding configuration 18 is generally accepted and used over a wide area of the great plains of North America. Although the present invention is described in relation to the GEN Manufacturing Ltd. planting unit 18, it will be appreciated that the ground engaging tip 20 in accordance with the present invention may be used on most any seed boot attachment. Accordingly, the particular planting unit 18 is not to be construed as limitation of the invention otherwise than as claimed herein.

It will be appreciated that within the geographic region of the great plains of North America many different soil types occur. The present invention is primarily concerned with soil that can be characterized as having highly abrasive properties. These types of soils significantly reduce the wear life of the tips 20 and seed boot attachments 10 thereby increasing maintenance costs and downtime as previously described.

Figure 2:
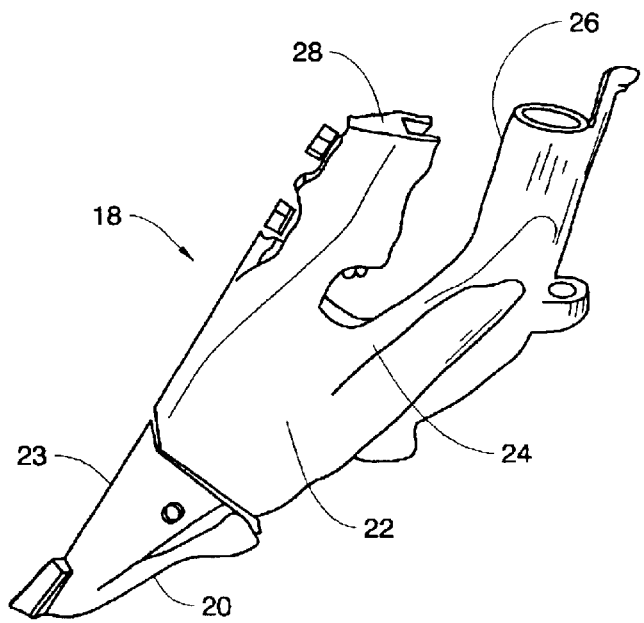
FIG. 2 is a side view of an opener including a ground engaging tip, main body and seed boot attachment.

Referring to FIG. 2, the main body member 22 of the seed boot attachment 10 comprises a housing 24 having front and rear brackets 26 projecting therefrom, a mounting area 28, inlets and outlets and internal passages (not shown). The mounting area 28 is for attachment to the tool bar 14 using conventional attachment means well known in the art.

Seed and fertilizer are typically delivered from conventional storage boxes to a metering assembly (not shown) of conventional design that supplies a controlled volume of seed and fertilizer to a flexible delivery tube 32. The lower end of the delivery tube 32 directs the seeds and fertilizer into separate inlets of the main body member 22 and through passages in the main body member to the seed boot attachment 10, for distribution in a single row into a furrow created by the seed boot attachment. For a more detailed discussion of the metering assembly, reference is made to U.S. Pat. No. 6,158,363, incorporated herein by reference.

As shown in the figures, the seed boot attachment 10 splits seed from the main body member 22 into two rows about 3 inches apart. The paired row of seeds straddles a single row of fertilizer. The fertilizer is placed about 1 inch deeper in the middle furrow than the seeds are placed in the adjacent rows.

Figure 3:
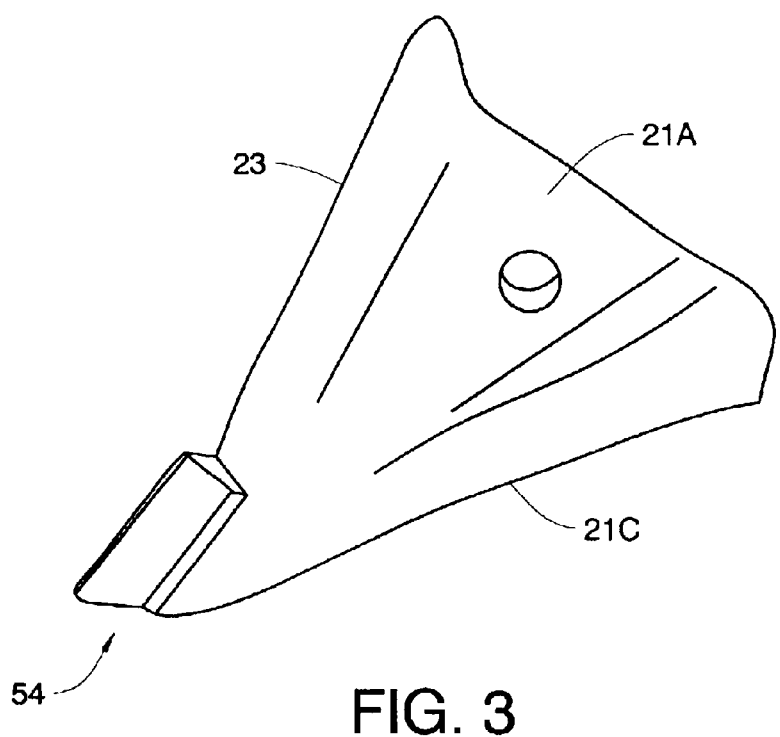
FIG. 3 is a perspective view of a seed boot attachment of FIG. 2.
Figure 4:
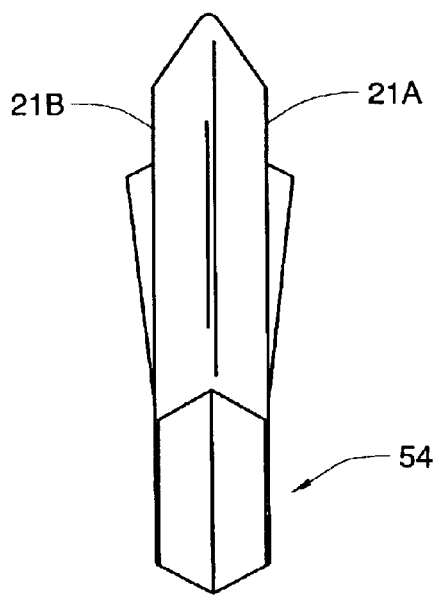
FIG. 4 is an end view of the seed boot attachment of FIG. 3.

The ground engaging tip 20 of the seed boot attachment 10 is of a generally conical shape. In a preferred embodiment, the ground engaging tip is commercially available from GEN Manufacturing Ltd., of Coaldale, Alberta, Canada, under the model designations GEN 49C and GEN 64. As shown in FIGS. 3 and 4, the ground engaging tip 20 is formed of three generally planar shape side surfaces 21a, 21b and 21c. Side surfaces 21a and 21b meet to form an inclined leading edge 23 extending from the forwardmost end of the ground engaging tip. A third side surface 21c extends between the two side surfaces 21a and 21b and forms a generally flat bottom side surface.

As shown in FIGS. 3 and 4, a wear resistant insert 52 is secured to a notch within the leading edge 23 extending from the forwardmost end of the ground engaging tip. The insert 52 is preferably secured to the notch and forms part of the leading edge by a brazing process selected as a function of the composition of the ground engaging tip 20 as well known in the art.

Figure 6:
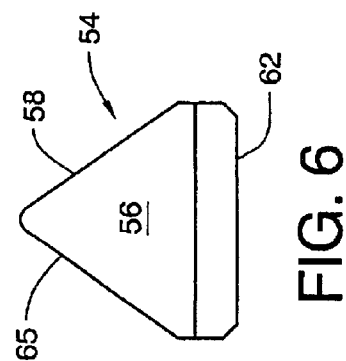
FIG. 6 is an end view of the wear resistant insert of FIG. 5.
Figure 5:
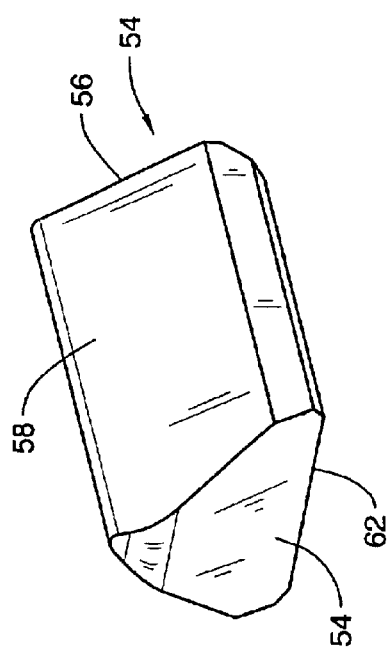
FIG. 5 is a perspective view of a wear resistant insert.
Figure 7:
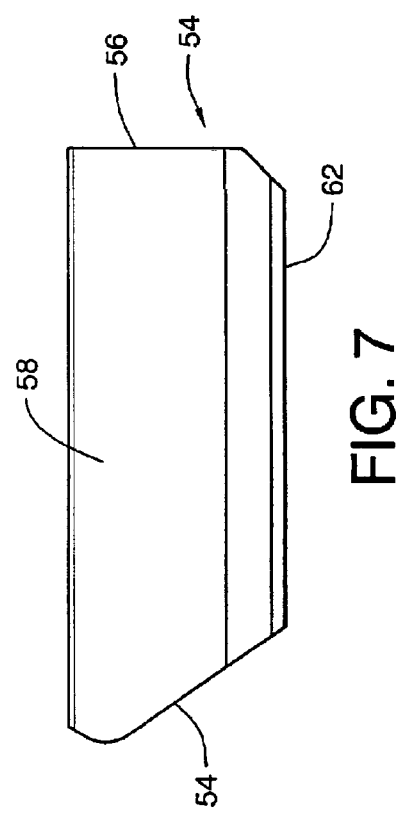
FIG. 7 is a side view of the wear resistant insert of FIG. 5.

As shown in FIGS. 5–7, at least one wear resistant insert 52 is secured to a notch within the leading edge of the ground engaging tip 20. The insert 52 is generally an elongated bar having a leading end 54, a trailing end 56 and three connecting side surfaces, a first side 58, second side 60 and a third side 62, to form a generally triangular cross-sectional elongated bar. The leading end 54 of the bar is angled. In a preferred embodiment, the intersection of the leading end 54 and the first and second sides 58 and 60 forms a radiused nose. The leading end 54 of the bar is radiused to reduce chipping and fracture of the wear resistant insert. Furthermore, the intersection of the first side and third side 58 and 62 and the second side and the third side 60 and 62 is chamfered to enhance the braze joints to the ground engaging tip 20. The intersection of the first side 58 and third side 60 forms a straight edge 59 extending from the leading end 54 to the trailing end 56.

The wear resistant insert 52 in accordance with the present invention is of a shape to enhance material flow over the insert and reduce susceptibility to breakage from impacts on obstructions and the like in the soil.

The inserts 52 are typically formed from a material that is more wear resistant than the material forming the ground engaging tip 20. In a preferred embodiment, the inserts 52 are formed from a material such as cemented carbide, more particularly tungsten carbide, tungsten-titanium carbide, etc., using procedures and processes well know in the art of cemented carbide. In a preferred embodiment, the cemented carbide is K3030C, commercially available from Kennametal Inc., comprising about 11–12 wt % cobalt and the remainder tungsten carbide.

While the invention has been specifically described in connection with certain specific embodiments thereof, it is to be understood that this is by way of illustration and not of limitation, and the scope of the appended claims should be construed as broadly as the prior art will permit.

What is claimed is:

1. A ground engaging tip for a seed boot attachment for depositing a seed within a furrow comprising:
   a conical shape member formed of three generally planar shape side surfaces wherein two of the side surfaces meet to form an inclined leading edge extending from a tip of the conical shape member; and
   at least one wear resistant insert secured to the leading edge of the conical shape member, the insert comprising a generally elongated bar having a leading end, a trailing end and three connecting side surfaces, a first side, second side and third side, to form a bar having a generally triangular cross-section, wherein the intersection of the first side and third side forms a straight edge extending from the leading end to the trailing end and aligned with the leading edge of the conical shape member and wherein the leading end of the bar is angled.

2. The ground engaging tip of claim 1 wherein the leading end and the first and second sides form a radiused nose.

3. The ground engaging tip of claim 1 wherein the intersection of first side surface and third side surface and second side surface and third side surface are chamfered.

4. The ground engaging tip of claim 1 wherein the first and second side surfaces converge downwardly from the third side surface to the leading edge.

5. The ground engaging tip of claim 1 wherein the wear resistant insert is secured to the ground engaging tip by brazing.

6. The ground engaging tip of claim 1 wherein the wear resistant insert is formed from cemented carbide.

7. The ground engaging tip of claim 1 wherein the wear resistant insert is formed from a material more wear resistant than the conical shape member.

8. The ground engaging tip of claim 1 wherein the wear resistant insert is formed from a material selected from the group consisting of tungsten carbide and tungsten-titanium carbide.

9. The ground engaging tip of claim 1 wherein the ground engaging tip is made by casting from a material selected from the group consisting of autempered ductile iron, chrome iron and heat treated steel and alloy steel.

10. A modular seed planting system including an elongated tool bar supported for movement by a plurality of wheels and which is adapted to be towed in a given forward direction, wherein attached to the tool bar are a plurality of planting units mounted in side-by-side relation relative to each other along the length of the tool bar, each planting unit including a replaceable ground engaging tip, a main body member and a rear seed boot attachment the ground engaging tip releasably attached to the forward end of the seed boot attachment, the ground engaging tip comprising:
   a conical shape member formed of three generally planar shape side surfaces wherein two of the side surfaces meet to form an inclined leading edge extending from a tip of the conical shape member; and
   at least one wear resistant insert secured to the leading edge of the conical shape member, the insert comprising a generally elongated bar having a leading end, a trailing end and three connecting side surfaces, a first side, second side and third side, to form a bar having a generally triangular cross-section, wherein the intersection of the first side and third side forms a straight edge extending from the leading end to the trailing end and aligned with the leading edge of the conical shape member and wherein the leading end of the bar is angled.

11. The seed planting system of claim 10 wherein the leading end and the first and second sides form a radiused nose.

12. The seed planting system of claim 10 wherein the intersection of first side surface and third side surface and second side surface and third side surface are chamfered.

13. The seed planting system of claim 10 wherein the first and second side surfaces converge downwardly from the third side surface to the leading edge.

14. The seed planting system of claim 10 wherein the wear resistant insert is secured to the ground engaging tip by brazing.

15. The seed planting system of claim 10 wherein the wear resistant insert is formed from cemented carbide.

16. The ground engaging tip of claim 10 wherein the wear resistant insert is formed from a material more wear resistant that the ground engaging tip.

17. The seed planting system of claim 10 wherein the wear resistant insert is formed from a material selected from the group consisting of tungsten carbide and tungsten-titanium carbide.

18. The seed planting system of claim 10 wherein the ground engaging tip is made by casting from a material selected from the group consisting of autempered ductile iron, chrome iron, heat treated steel and alloy steel.

* * * * *